United States Patent Office 3,295,992
Patented Jan. 3, 1967

3,295,992
REDUCING THE STICKINESS OF HOT CANDY
Robert F. Frey, Greensboro, N.C., assignor to Richardson-Merrell Inc., New York, N.Y., a corporation of Delaware
No Drawing. Filed Aug. 28, 1963, Ser. No. 305,189
3 Claims. (Cl. 99—134)

This invention relates to the manufacture of candy and more particularly to the prevention of stickiness in the candy during the manufacturing process.

In the preparation of cooked candies, a solution of saccharides (usually sucrose plus corn syrup and/or invert syrup) is heated until the water content has been reduced to the desired level. This hot cooked candy is then further processed into its final form. The stickiness of the hot candy mass is a major problem in the further processing which includes mixing flavor, color, and other ingredients into the hot candy mass and forming the candy into the desired shape.

To retard the sticking of the hot candy to the metal surfaces with which it comes in contact, many types of coatings and lubricants are used. The most common method to prevent stickiness is to coat the metal surfaces with various fats, oils, and in some cases, even certain types of waxes. However, most of these are at best only partially successful and additionally, the hot candy mass will come in contact with some metal surfaces which cannot be adequately lubricated or coated.

I have found that by adding non-hygroscopic polyethylene glycols to the hot candy mass, the stickiness is dramatically reduced. The addition of non-hygroscopic polyethylene glycols to candy formulations acts as a preventative of stickiness rather than a cure and in effect, polyethylene glycol acts as an internal or built-in lubricant, thereby reducing or in many cases eliminating the need for any external lubricants.

Non-hygroscopic polyethylene glycols have the added advantage of being safe to use, stable, and virtually tasteless whereas most of the commonly used surface lubricants are vegetable or animal derived products which characteristically become rancid and develop objectionable off-tastes.

Non-hygroscopic polyethylene glycols have been found to be useful internal lubricants in most cooked candies and in particular in hard candies and chewy candies such as caramels, salt water taffy, English toffee, and nougat. To demonstrate the invention, a few of its applications are included.

The production of hard candy involves three main steps. A solution of sugar or sugars is cooked until most of the water is removed from the solution by evaporation. The resulting hot candy mass has a pourable plastic consistency. Flavoring materials, colors, and other ingredients are added to the hot candy mass by mechanically working it on a steel cooling slab with suitable mixing equipment. As these flavoring agents are being worked into the candy, it cools and hardens to a point where it is a semi-solid plastic of sufficient hardness to just about hold a formed shape. The semi-solid plastic mass is formed into a continuous rope and then fed into a drop forming machine in which small pieces are continually cut from the rope and formed into the desired shape. The formed drops are then cooled with cold, dry air and the candy pieces harden to a rigid solid.

Stickiness of the hot candy mass is a problem during both the mixing and forming steps, particularly with fruit flavored candy where citric acid is added to the hot candy mass. Stickiness is a function of temperature with stickiness decreasing as the temperature of the hot candy decreases. Thus besides the coating or lubricating of the metal contact surfaces, hard candy manufacturers have developed another means of reducing the stickiness by mixing and forming at the lowest possible temperature. However, as the temperature of the hot candy mass is lowered, the viscosity of the candy mass increases, thereby making mixing and forming more difficult.

The present invention is based upon the discovery that polyethylene glycols, when added to the hot candy mass, greatly reduce its stickiness. The need for surface lubricants on metal contact surfaces is thus avoided and the temperature of the hot candy mass can be higher, thereby making mixing and forming easier without danger of stickiness.

A noticeable reduction in the stickiness of hard candy can be observed when as little as 0.05 percent by weight of a non-hygroscopic polyethylene glycol is added to the hot candy mass. Generally, 0.25 percent by weight of the polyethylene glycol is sufficient to reduce the stickiness of highly cooked hard candy to a satisfactory degree. Seldom is it necessary to add more than about 0.5 percent by weight when making hard candy but in other types of sticky candy, it may be desirable to add as much as 10 percent by weight.

Although it is easy to observe the reduction of stickiness when polyethylene glycol is added to a hot candy mass, it is difficult to quantitatively evaluate stickiness and find some meaningful measure of stickiness. However, the following test was developed to demonstrate the reduction of stickiness of hard candy by non-hygroscopic polyethylene glycol.

A solution of 65 percent by weight (dry basis) of sucrose and 35 percent by weight (dry basis) of corn syrup and sufficient water to dissolve the materials is cooked to 296° F. and then subjected to a vacuum which reduces the moisture content and the temperature of the hot candy mass to about 260° F. The hot candy mass is then transferred to a mixing table and flavor and citric acid (0.3 percent by weight) are added. The mass is mixed and cooled until the temperature is reduced to about 215° F. It is then transferred to the forming equipment. Under these conditions there is some stickiness but generally good release of the pieces from the forming punches. At 220° F. there is poor release of the pieces from the forming punches. At 225° F. stickiness is so severe at the forming punches that uniform pieces cannot be made. When the above was repeated with, however, the addition of 0.5 percent by weight of a polyethylene glycol having an average molecular weight in the range 3,000 to 3,700, there was no stickiness during the mixing and even when the hot candy mass was transferred to the forming equipment at 230° F., there was good release of the formed pieces with no stickiness at the forming punches.

When using only 0.25 percent by weight of the polyethylene glycol, there is no stickiness at the forming punches at 225° F. It was also found that when using the polyethylene glycol, a smoother candy piece could be formed with considerably less wear and tear on the forming equipment because of the higher temperatures at which the hard candy could be formed.

Polyethylene glycols are also effective in reducing the stickiness of other types of candy. In most chewy candy such as caramels, salt water taffy, English toffee, and nougats, some type of fat is used in the formula to reduce the stickiness, both in process and during chewing of the candy. It has been found that polyethylene glycols can be used to augment the lubrication contributed by the added fats and in some cases to completely replace the normally used fatty lubricant.

As an example of the use of non-hygroscopic polyethylene glycols in chewy candies, a standard nougat was prepared. Nougat is a mixture of marshmallow (aerated candy) and hard candy (high-cooked candy). The basic formula used was as follows:

| | Percent |
|---|---|
| Frappé (aerated candy) | 25 |
| Hard candy | 75 |

The frappé consisted of:

| | Percent |
|---|---|
| Dried egg whites | 10 |
| Corn syrup | 60 |
| Standardized invert sugar | 15 |
| Water | 15 |

The hard candy consisted of:

| | Percent |
|---|---|
| Sucrose | 50 |
| Corn syrup solids | 40 |
| Invert sugar solids | 8.3 |
| Water | 1.7 |

The frappé portion was made by soaking the dried egg whites in water and then combining with the corn syrup and invert followed by whipping until mixture is light and fluffy. The hard candy portion was made by cooking the sugar, corn syrup, and invert to about 315° F. and immediately blending it with the frappé.

A batch of nougat made in this manner was divided into three portions. To the first portion 4 percent by weight 92° hydrogenated coconut oil was added. To the second portion 4 percent by weight of a non-hygroscopic polyethylene glycol of average molecular weight in the range 3,000 to 3,700 was added. Nothing was added to the third portion.

A simple test was devised to evaluate the stickiness of the three samples. This consisted of bringing each sample to 95° F. and then plunging a stainless steel knife into the candy mass and withdrawing it again. The number of times the knife can be plunged and withdrawn from the candy mass before the candy sticks to the knife is a function of the stickiness of the candy. The average results with each portion is given below. Twenty tests on each batch were done.

| | Average number of plunges |
|---|---|
| Plain nougat | 1.4 |
| Nougat+4% 92°-hydrogenated CNO | 3.6 |
| Nougat+4% polyethylene glycol | 4.4 |

The above procedure was also repeated with a basic salt water taffy formula candy. In this case polyethylene glycol was substantially equal to the hydrogenated coconut oil in reducing the stickiness of the taffy, both being highly effective.

The polyethylene glycols that may be used in practicing the present invention are preferably non-hygroscopic to avoid the attraction of water to the candy and resulting development with time of stickiness and loss of physical attractiveness. In general, they have a molecular weight of about 1,000 or higher and are commercially available. Preferably they should have a melting point below that at which they are to be worked into the candy and should have a reasonable degree of solubility in water, particularly when clear candy is desired. Polyethylene glycols having a molecular weight of from about 1,000 up to and in excess of 20,000 can be used in practicing the process.

What is claimed is:
1. A method of reducing the stickiness of hot candy which comprises incorporating therein 0.05 to 10 percent by weight of a non-hygroscopic polyethylene glycol while the candy is hot.
2. A method of reducing the stickiness of hot hard candy which comprises mixing in the plastic hard candy at temperatures above 200° F., 0.05 to 10 percent by weight of a non-hygroscopic polyethylene glycol.
3. A method of manufacturing hard candy of a reduced tendency to stick to metals when hot which comprises mixing 0.05 to 10 percent by weight of a polyethylene glycol having a molecular weight in excess of 1,000 while the candy mass is above 200° F.

References Cited by the Examiner

UNITED STATES PATENTS

| 2,540,253 | 2/1951 | Gakenheimer | 99—78 X |
| 2,784,100 | 3/1957 | Endicott et al. | 99—141 |
| 2,889,226 | 6/1959 | Hinkley | 99—78 X |

FOREIGN PATENTS

| 36/7,337 | 6/1961 | Japan. |

OTHER REFERENCES

Clyne: "A Course in Confectionery," 1955, published by Specialized Publications, Ltd., Surrey, England, pp. 184–185.

Robinson: "Candy Bibliography (January 1944 to July 1954)," 1955, Southern Research Laboratory, U.S.D.A., p. 87 (items numbered 1165 and 1166).

A. LOUIS MONACELL, *Primary Examiner.*

J. M. GOLIAN, *Assistant Examiner.*